(12) United States Patent
Hisamatsu

(10) Patent No.: US 7,505,679 B2
(45) Date of Patent: Mar. 17, 2009

(54) IMAGE-TAKING APPARATUS

(75) Inventor: Koji Hisamatsu, Asaka (JP)

(73) Assignee: Fujifilm Corporation, Tokyo (JP)

( * ) Notice: Subject to any disclaimer, the term of this patent is extended or adjusted under 35 U.S.C. 154(b) by 345 days.

(21) Appl. No.: 11/359,548

(22) Filed: Feb. 23, 2006

(65) Prior Publication Data
US 2006/0192879 A1    Aug. 31, 2006

(30) Foreign Application Priority Data
Feb. 25, 2005    (JP) .............................. 2005-050030

(51) Int. Cl.
*G03B 3/00* (2006.01)
*G03B 17/18* (2006.01)

(52) U.S. Cl. ...................... 396/137; 396/287

(58) Field of Classification Search ............... 396/137, 396/287, 239, 243; 348/333.01–333.05, 348/333.11
See application file for complete search history.

(56) References Cited

U.S. PATENT DOCUMENTS

| | | | | |
|---|---|---|---|---|
| 5,086,314 A | * | 2/1992 | Aoki et al. ................ | 396/61 |
| 5,915,133 A | * | 6/1999 | Hirai et al. ................ | 396/48 |
| 6,614,996 B2 | * | 9/2003 | Okisu et al. ............... | 396/63 |
| 2002/0027602 A1 | * | 3/2002 | Ejima et al. ............... | 348/232 |
| 2006/0072028 A1 | * | 4/2006 | Hong ........................ | 348/333.01 |

FOREIGN PATENT DOCUMENTS

JP    6-59829 U    8/1994
JP    9-281541 A   10/1997

* cited by examiner

*Primary Examiner*—Christopher E Mahoney
*Assistant Examiner*—Minh Phan
(74) *Attorney, Agent, or Firm*—Birch, Stewart, Kolasch & Birch, LLP

(57) ABSTRACT

The present invention provides an image-taking apparatus whose CPU causes a display section to display recommended shooting modes according to a time frame on a liquid crystal monitor. The apparatus allows a user to readily select one, which is suitable for the scene where the user wants to take an image, from among the displayed shooting modes by operating a cross key and a MENU/OK button.

8 Claims, 8 Drawing Sheets

The present invention relates to an image-taking apparatus that includes two or more kinds of shooting modes for taking images in different shooting conditions and takes an image according to one selected from the shooting modes.

IMAGE-TAKING APPARATUS

BACKGROUND OF THE INVENTION

1. Field of the Invention

The present invention relates to an image-taking apparatus that includes two or more kinds of shooting modes for taking images in different shooting conditions and takes an image according to one selected from the shooting modes.

2. Description of the Related Art

Many of recent digital cameras provide various shooting modes to make the cameras user-friendly. There is no need for a user of such cameras to establish various conditions required for shooting because the conditions are automatically set in response to one of the shooting modes being selected by the user.

However, some of recent digital cameras provide too many shooting modes, making setting operations complicated. Therefore, some users of such cameras have trouble going back to the standard shooting mode after setting one of the shooting modes.

Considering these situations, Japanese Patent Application Publication No. 6-59829 provides a digital camera that enables a user to readily go back to the initial setting mode by simultaneously and continuously operating two operation members.

Also, Japanese Patent Application Publication No. 9-281541 discloses a user-friendly digital camera. In this digital camera, a control section causes other internal sections to automatically set shooting conditions according to factors such as a distance from a subject whose image is captured by an image-taking optical system.

However, the digital camera disclosed in Japanese Patent Application Publication No. 9-281541 is not applicable to some of recent digital cameras having various shooting modes including one requiring a flash, one requiring a depth of field to be changed, one requiring the brightness of field to be adjusted, and the like. This is because the digital camera disclosed in Japanese Patent Application Publication No. 9-281541 is not configured to automatically set shooting conditions according to one of these various shooting modes, which requires a user to carry out complicated manual operations.

SUMMARY OF THE INVENTION

The present invention has been made in view of the above circumstances, and provides an image-taking apparatus which has various shooting modes and enables a user to readily change the shooting mode.

An image-taking apparatus according to the present invention has plural kinds of shooting modes for taking images in different shooting conditions and takes an image according to one selected from the shooting modes, the apparatus including:

a built-in clock which keeps the current time;

a display section which has a display screen and displays an image on the display screen;

a display control section which causes the display section to display at least one of recommended shooting modes according to a time frame, the recommended shooting modes varying with time frames; and a mode selecting section which selects any of the recommended shooting modes displayed by the display section in response to an operation.

In the image-taking apparatus of the invention, the display control section causes the display section to display at least one of recommended shooting modes according to a time frame including the time indicated by the built-in clock. This allows a user to select one of the displayed recommended shooting modes by operating the mode selecting section while looking at the display screen.

The image-taking apparatus of the invention is capable of displaying on the display screen any of: recommended shooting modes requiring a flash at night; recommended shooting modes requiring the change of white balance and brightness of field in the daytime; or recommended shooting modes suitable for shooting a subject in a relatively close-range in the morning. Then, a user can readily select one of the recommended shooting modes displayed on the display screen.

That is, the present invention implements an image-taking apparatus allowing a user to easily change the shooting mode even if the apparatus provides various shooting modes.

Further, the display control section may cause the display section to display at least one of the recommended shooting modes according to a time frame in response to power-on of the image-taking apparatus.

This additional feature allows the display screen to display at least one of the recommended shooting modes according to a time frame including the time at which an image is going to be taken, and allows a user to select one of the displayed recommended shooting modes.

With such an additional feature, a user can shoot an image of a subject upon selecting a shooting mode suitable for the shooting, which can be carried out very quick.

Furthermore, the display control section may cause the display section to display at least one of the recommended shooting modes according to a time frame in response to a user's operation requiring the display of the recommended shooting modes.

Such an additional feature allows a user to readily select one of the recommended shooting modes according to a time frame without going through complicated operations even when the user wants to change the current shooting mode to another shooting mode.

Still furthermore, the display control section may cause the display section to display at least one of the recommended shooting modes according to a time frame as well as a standard shooting mode irrespective of the time frames.

If the image-taking apparatus is configured such that the standard shooting mode is displayed together with the recommended shooting modes according to a time frame, a user can quickly go back to the standard shooting mode when the user wants to do so.

As described above, the present invention implements an image-taking apparatus that allows a user to readily change the shooting mode.

DETAILED DESCRIPTION OF THE INVENTION

An embodiment of the present invention will be described with reference to the drawings.

Figure 1:
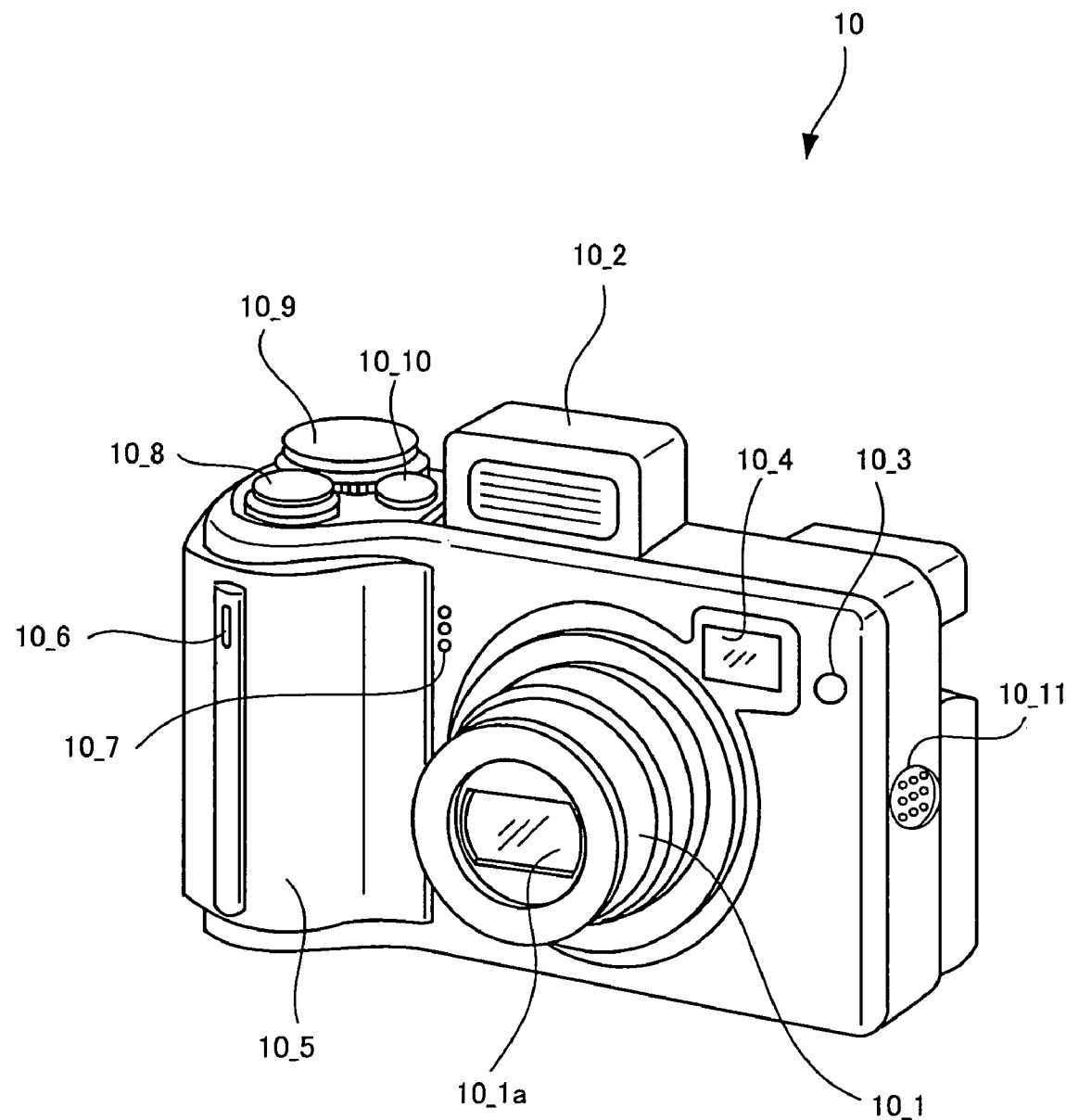
FIG. 1 is an external perspective view of a digital camera according to an embodiment of an image-taking apparatus of the present invention.

FIG. 1 is an external perspective view of a digital camera 10 according to an embodiment of the image-taking apparatus of the present invention. The digital camera 10 shown in FIG. 1 has two or more kinds of shooting modes for shooting in different conditions and performs shooting according to one selected from the shooting modes.

Disposed in the center of the front face of the digital camera 10 is a zoom barrel 10_1 containing an image-taking lens 10_1a as an optical zoom lens. Further, the upper part of the front face of the digital camera 10 is provided with a flash emitting device 10_2 for emitting a flash synchronized with shooting, a flash sensor 10_3 for detecting the amount of flash emitted by the flash emitting device 10_2 to control the amount of flash, and an optical finder objective window 10_4.

Furthermore, the left part of the front face of the digital camera 10 is provided with a grip 10_5 whose shape allows a user to securely hold the camera 10, a self-timer lamp 10_6 that blinks when a self-timer is operating and the like, and a microphone 10_7 for picking up voice.

Disposed on the top face of the digital camera 10 are a shutter button 10_8, a mode dial 10_9 used for various kinds of settings, and a power button 10_10.

The right flank of the digital camera 10 is provided with a speaker 10_11.

Figure 2:
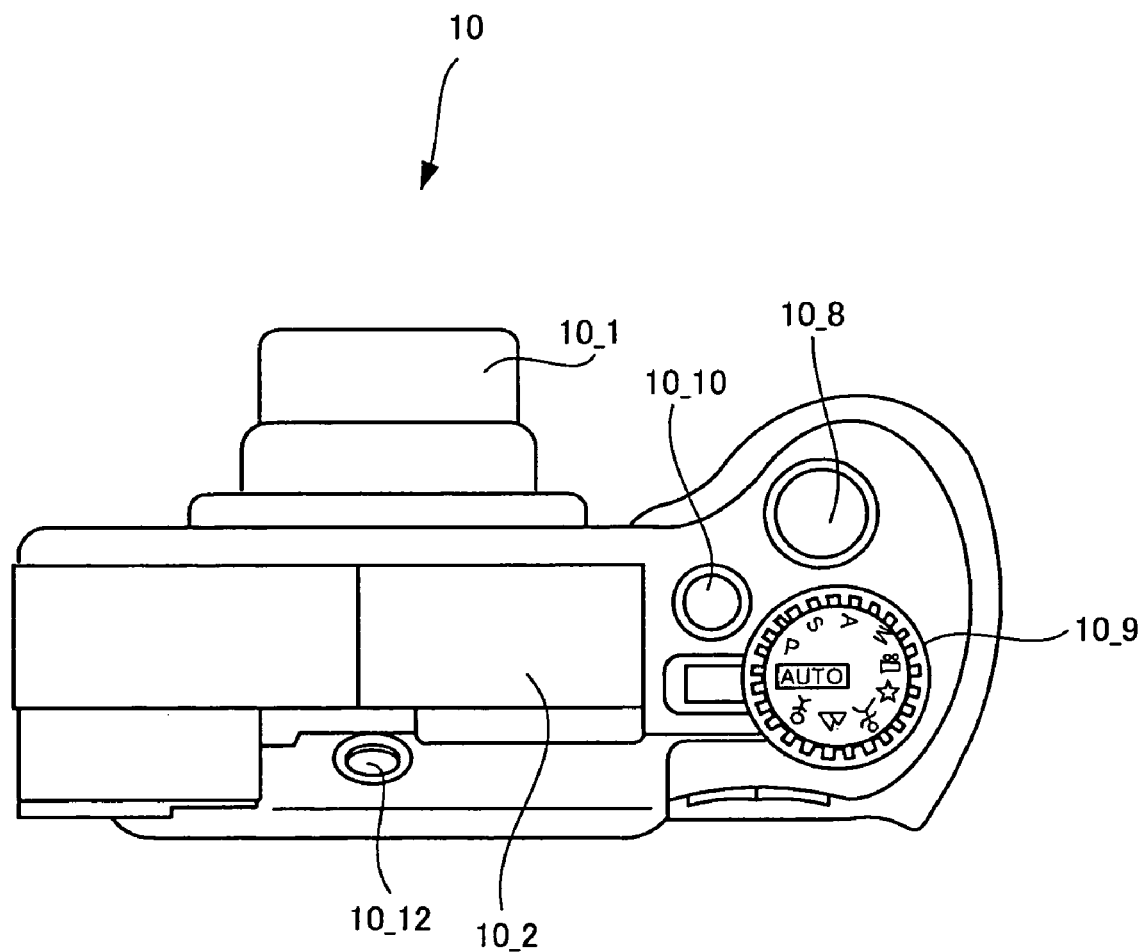
FIG. 2 is an external view of the digital camera shown in FIG. 1, which is viewed from above.

FIG. 2 is an external view of the digital camera 10 shown in FIG. 1, which is viewed from above.

In addition to the flash emitting device 10_2, the shutter button 10_8, the mode dial 10_9, and the power button 10_10 disposed on the top face, the digital camera 10 has, on a downwardly sloping surface thereof, a pop-up button 10_12 for causing the flash emitting device 10_2 to pop up. Meanwhile, the mode dial 10_9 has printed thereon an icon "AUTO" indicating an automatic mode, an icon "P" indicating a program automatic mode, an icon "S" indicating a shutter speed priority automatic mode, an icon "A" indicating an aperture priority automatic mode, an icon "M" indicating a manual mode, an icon indicating a moving image mode, and four icons respectively indicating four scene positions (night-view, sports, landscape and portrait). It is possible to select a desired mode by rotating the mode dial 10_9. Now, the respective modes will be described below.

The automatic mode (AUTO) is a mode for allowing the camera 10 to automatically control all parameters including exposure, white balance and the like. The automatic mode corresponds to the "standard shooting mode" according to the present invention. The program automatic mode (P) is a mode for automatically setting up the shutter speed and the aperture. The shutter speed priority automatic mode (S) is a mode for preferentially setting up the shutter speed. The aperture priority automatic mode (A) is a mode for preferentially setting up the aperture. The manual mode (M) is a mode for freely setting up the shutter speed and the aperture. The moving image mode indicated with the icon next to the manual mode (M) is a mode for shooting a moving image. Moreover, the four scene position modes arranged clockwise after the moving image mode are used for selecting any one of the four shooting scenes (night-view, sports, landscape and portrait)

In the following description, the four scene position modes may be referred to as night-view, sports, landscape, and portrait modes.

The night-view mode is a mode suitable for shooting an image while emphasizing an ambience such as an evening view or a night view. The sports mode is a mode suitable for shooting an image of a moving object. The landscape mode is a mode suitable for shooting an image of a landscape such as a building or a mountain in the daytime. The portrait mode is a mode suitable for shooting a portrait image optimized to capture a flesh color beautifully.

Besides these various shooting modes according to various scene positions, the digital camera 10 includes other shooting modes such as a close-view mode suitable for shooting a view in a close range, a distant-view mode suitable for shooting a view in a long range, a close-up mode suitable for shooting an image on a blurred background by shortening the depth of field. In addition, the digital camera 10 also includes an Auto Exposure/Auto White Balance (AE/AWB) mode for automatically determining factors such as the amount of light, color information, etc.

Figure 3:
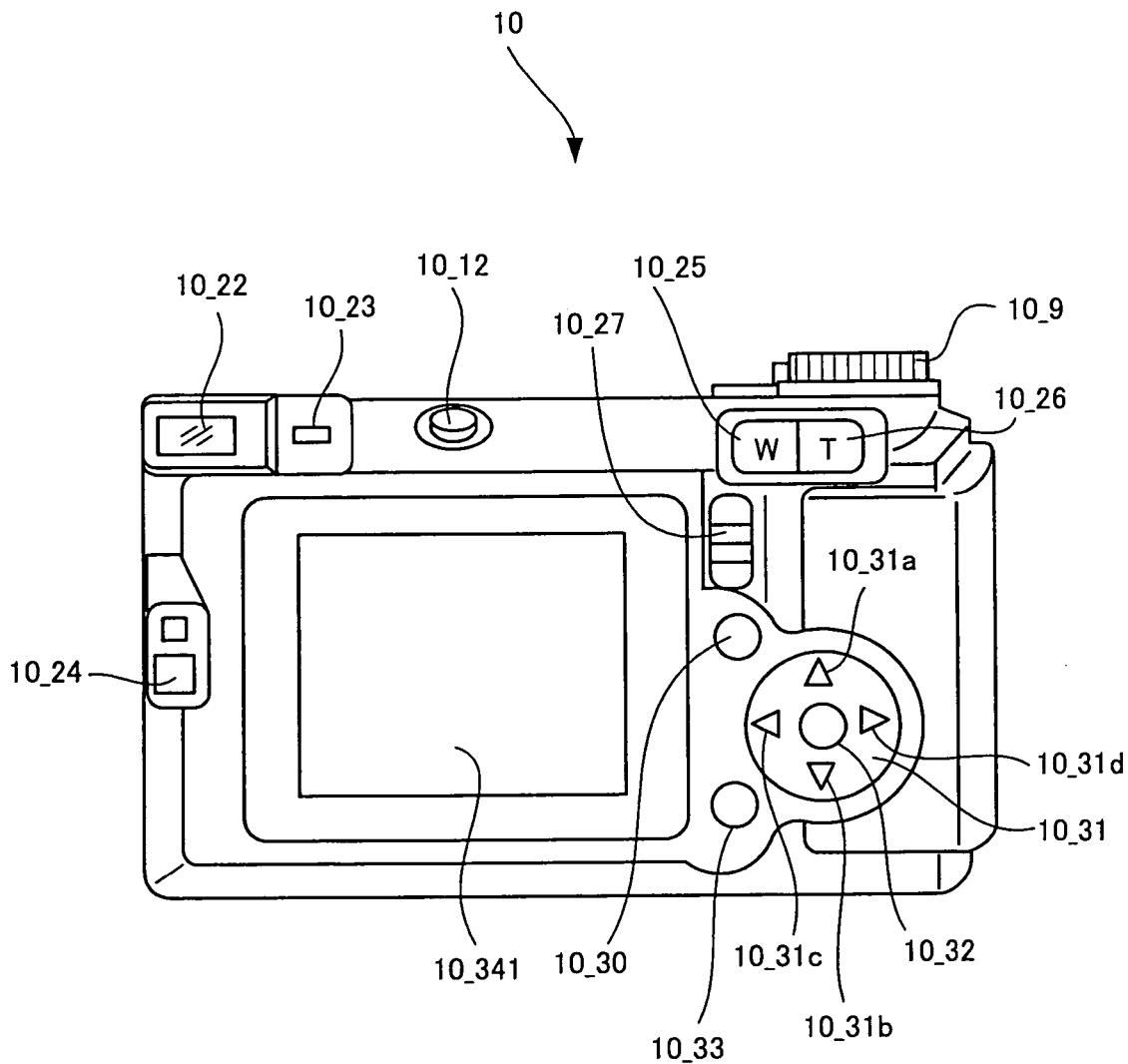
FIG. 3 is an external view of the digital camera shown in FIG. 1, which is viewed from the back.

FIG. 3 is an external view of the digital camera 10 shown in FIG. 1, which is viewed from the back.

As shown in FIG. 3, the upper part of the back face of the digital camera 10 is provided with an optical finder eyepiece window 10_22, a finder lamp 10_23 configured to be turned on at the time of completing preparation for shooting or to blink in the course of shooting an image, an exposure correction button 10_24, a wide-angle zoom button 10_25 for zooming in to a wide-angle side when pressed down, a telephoto zoom button 10_26 for zooming out to a telephoto side when pressed down, and a mode switch 10_27 which switches between a shooting mode and a playback mode.

Below the mode switch 10_27, there are disposed a photographic mode button 10_30, a cross button 10_31, a MENU/OK button 10_32, and a DISP/BACK button 10_33. In addition, a liquid crystal monitor 10_341 is disposed in a central area on the back face of the digital camera 10.

The photographic mode button 10_30 is a button for setting up the number of pixels, sensitivity, colors, the number of prints, and the like.

When a menu screen or the like is displayed on the liquid crystal monitor 10_341, the cross key 10_31 allows a user to select a menu item by operating four buttons of an upper button 10_31a, a lower button 10_31b, a left button 10_31c, and a right button 10_31d. The left button 10_31c also serves as a button for selecting a macro shooting mode. When the left button 10_31c is pressed down, the shooting mode is switched to the macro shooting mode. The macro shooting mode is released when the left button 10_31c is pressed down again. Moreover, the right button 10_31d also serves as a flash button. The right button 10_31d is the button for switching the state of the flash circularly from an automatic flash, to a red-eye reduction flash, to a forcible flash, to no flash, to a slow synchronous flash, and then back to the automatic flash every time the button is pressed down. The MENU/OK button 10_32 is a button for displaying various menus at the time of shooting or playback and for confirming a selected menu. The DISP/BACK button 10_33 serves both as a DISP button and a BACK button. In the case of the DISP button, the DISP/BACK button 10_33 functions as the button for switching the state of a screen displayed on the liquid crystal monitor 10_341, and is used for turning on or off a display image on the liquid crystal monitor 10_341 at the time of shooting or turning on or off a character display at the time of playback, for example. In contrast, in the case of the BACK button, the DISP/BACK button 10_33 functions as the button for placing the state of operation attributable to the MENU/OK button 10_32 and the like back to the previous state or for canceling the current state of operation.

As described above, the digital camera 10 is so configured as to make user operations for selecting one of multiple shooting modes as simple as possible, which makes the digital camera 10 user-friendly.

Also, even users who are not good at operating buttons can readily use the digital camera 10 thanks to the following configuration. In the digital camera 10, the power is supplied from a power source to the digital camera 10 when the power button 10_10 is pressed. In this state, if the mode switch 10_27 has been switched to the shooting mode, at least one recommended shooting mode is displayed on the liquid crystal monitor 10_341. One of recommended shooting modes can be readily selected by operating the cross key 10_31 and the MENU/OK button 10_32, which will be described later in detail.

Figure 4:
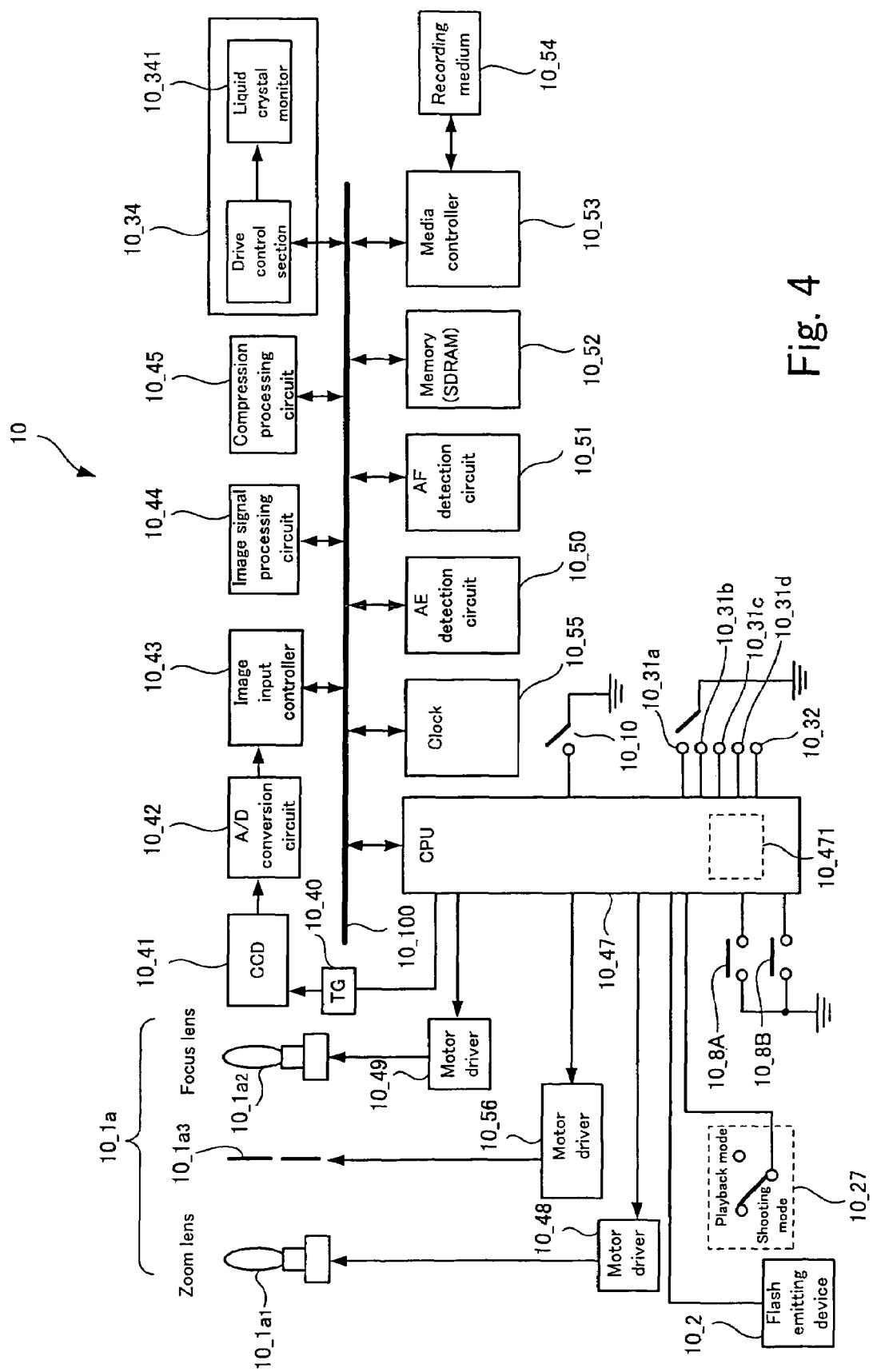
FIG. 4 is a block diagram showing a circuit configuration of the digital camera shown in FIGS. 1 through 3.

FIG. 4 is a block diagram showing a circuit configuration of the digital camera 10 shown in FIGS. 1 through 3.

The circuit configuration will be described along the flow of image signals. If the power is turned on in the state when the mode switch 10_27 shown in FIG. 3 is switched to the shooting mode (or if the mode switch 10_27 is switched from the playback mode to the shooting mode after the power is turned on), a CPU 10_47 causes a display section 10_34 to display recommended shooting modes on the liquid crystal monitor 10_341 in response to these operations. After the recommended shooting modes are displayed on the liquid crystal monitor 10_341, if one of the shooting modes is selected through operations made on the buttons 10_31a, 10_31b, 10_31c, and 10_31d of the cross key 10_31 and the MENU/OK button 10_32, the CPU 10_47 activates a program describing procedures for the selected mode in order to prepare for shooting. Subsequently, according to the procedures described in the activated program, the CPU 10_47 causes the display section 10_34 to change the screen displayed on the liquid crystal monitor 10_341 to a through image (live view). Display processing performed by the CPU 10_47 will be described later in detail.

First, there will be briefly described the flow of image signals that represent a through image to be displayed by the display section 10_34 after one of the recommended shooting modes is selected by operations made on the buttons 10_31a, 10_31b, 10_31c, and 10_31d of the cross key 10_31 and the MENU/OK button 10_32.

FIG. 4 shows an image-taking lens section 10_1a required for the operations of circuits arranged thereafter. As shown in FIG. 4, the image-taking lens section 10_1a includes a zoom lens $10\_1a_1$ and a focus lens $10\_1a_2$ as main elements. FIG. 4 also shows a diaphragm $10\_1a_3$ whose aperture is controlled to restrict the amount of shooting light when a mode such as the aperture priority automatic mode is selected through the mode dial 10_9.

The image-taking lens section 10_1a forms subject light on an image pickup device (hereinafter referred to as "CCD" as a charge-coupled device type of image pick device is employed in the embodiment) 10_41 arranged in the next stage. Subsequently, the CCD 10_41 generates image signals representing the formed subject light.

Now, there will be described how image signals are generated by the CCD 10_41 and how the generated signals are transmitted to circuits following the CCD 10_41.

Under the control of the CPU 10_40, a timing generator (hereinafter refer to as "TG") 10_40 repeatedly supplies an exposure-starting signal and an exposure-ending signal at predetermined intervals for causing the CCD 10_41 to generate image signals representing a through image at predetermined intervals. Upon termination of exposure in accordance with an exposure-ending signal from the TG 10_40, the CCD 10_41 outputs image signals (hereinafter referred to as "RGB signals") representing a through image to an A/D conversion circuit 10_42.

Upon receipt of the RGB signals, the A/D conversion circuit 10_42 converts the received analog RGB signals into digital RGB signals that are then output to a bus line 10_100 through an image input controller 10_43.

The digital RGB signals are then transmitted through the bus line 10_100 to an image signal processing circuit 10_44 where the digital RGB signals are converted into digital YC signals. The digital YC signals are then sent to a video encoder (not shown) and an image based on the YC signals is displayed on the liquid crystal monitor 10_341 of the display section 10_34. YC signals are obtained based on RGB signals that are generated by the CCD 10_41 at predetermined intervals. Therefore, the image displayed on the liquid crystal monitor 10_341 sequentially changes based on the YC signals at predetermined intervals. Accordingly, the liquid crystal monitor 10_341 continuously displays a through image of a subject to which the image-taking lens section 10_1a is directed.

The above-described configuration enables a user to take an image by pressing the shutter button 10_8 in the right moment to shoot while looking at the liquid crystal monitor 10_341 without using the optical finder eye piece window 10_22.

Next, there will be described the flow of image signals in shooting processing to be performed in response to the press of the shutter button 10_8.

According to the embodiment, the shutter button 10_8 of the digital camera 10 first enters a half-press state when pressed, which makes a first connection point 10_8A become connected. Subsequently, the CPU 10_47 causes an AE detection circuit 10_50 to adjust exposure and simultaneously causes an AF detection circuit 10_51 to adjust focus so that exposure and focus are promptly set to be ready for the full-press of the shutter button 10_8.

Under the control of the CPU 10_47, the AE detection circuit 10_50 detects brightness required for exposure setting. Based on a result of detection by the AE detection circuit 10_50, the CPU 10_47 performs processing such as adjusting the aperture size of the diaphragm $10\_1a_3$ by controlling a motor driver 10_56 and causing the flash emitting device 10_2 to emit a flash. The AE detection circuit 10_50 also includes an Auto White Balance (AWB) circuit that adjusts the white balance. Based on the adjusted white balance, color-adjusting parameters are set in the image signal processing circuit 10_44 so that colors can be corrected.

Meanwhile, under the control of the CPU 10_47, the AF detection circuit 10_51 causes the focus lens $10\_1a_2$ to move from the closest point to the farthest point. While the focus lens $10\_1a_2$ is moving, the AF detection circuit 10_51 detects subject contrasts at some points in the course of the movement and obtains the peak of the subject contrasts detected at the respective points as a focus.

In this way, exposure and focus settings are performed in response to the half-press of the shutter button 10_8. After the completion of these settings, upon the full-press of the shutter button 10_8, the first connection point 10_8A and a second connection point 10_8B both enter a connected state. In response to this connection, the TG 10_40 sequentially supplies the CCD 10_41 with an exposure-starting signal and an exposure-ending signal according to a shutter speed. Upon receipt of the exposure-ending signal, the CCD 10_41 outputs RGB signals to the A/D conversion circuit 10_42. The A/D conversion circuit 10_42 converts the received RGB signals into digital signals, which are then sent to the bus line 10_100 by way of the image input controller 10_43.

The RGB signals on the bus line 10_100 are all stored in a memory (SDRAM) 10_52 and then read out therefrom to the image signal processing circuit 10_44. The image signal processing circuit 10_44 converts the read RGB signals into YC signals, which are then sent to a compression processing circuit 10_45 where the YC signals are compressed into JPEG YC signals. The JPEG YC signals are then recorded in a recording medium 10_54 through a media controller 10_53.

In addition to the above-described configuration, the digital camera 10 of the embodiment includes a built-in clock 10_55. The CPU 10_47 obtains time data from the clock 10_55 and causes the display section 10_34 to display at least one of recommended shooting modes according to a time frame including the obtained time data. Specifically, in response to the press of the power button 10_10, the CPU 10_47 obtains time data from the clock 10_55 through the bus line 10_100 and causes the display section 10_34 to display the most frequently used shooting mode in a time frame including the obtained time as a recommended shooting mode on the liquid crystal monitor 10_341. When an automatic mode (Auto) is selected, processing represented by the AUTO on the mode dial 10_9 is performed inside the digital camera 10. As mentioned above, the automatic mode (AUTO) is a mode for allowing the camera 10 to automatically control all parameters including exposure, white balance and the like irrespective of time, which is the standard shooting mode of the digital camera 10.

Now, there will be described how the CPU 10_47 causes the display section 10_34 having the liquid crystal monitor 10_341 to perform display processing upon the press of the power button 10_10 (or upon switching from the playback mode to the shooting mode).

Figure 5:
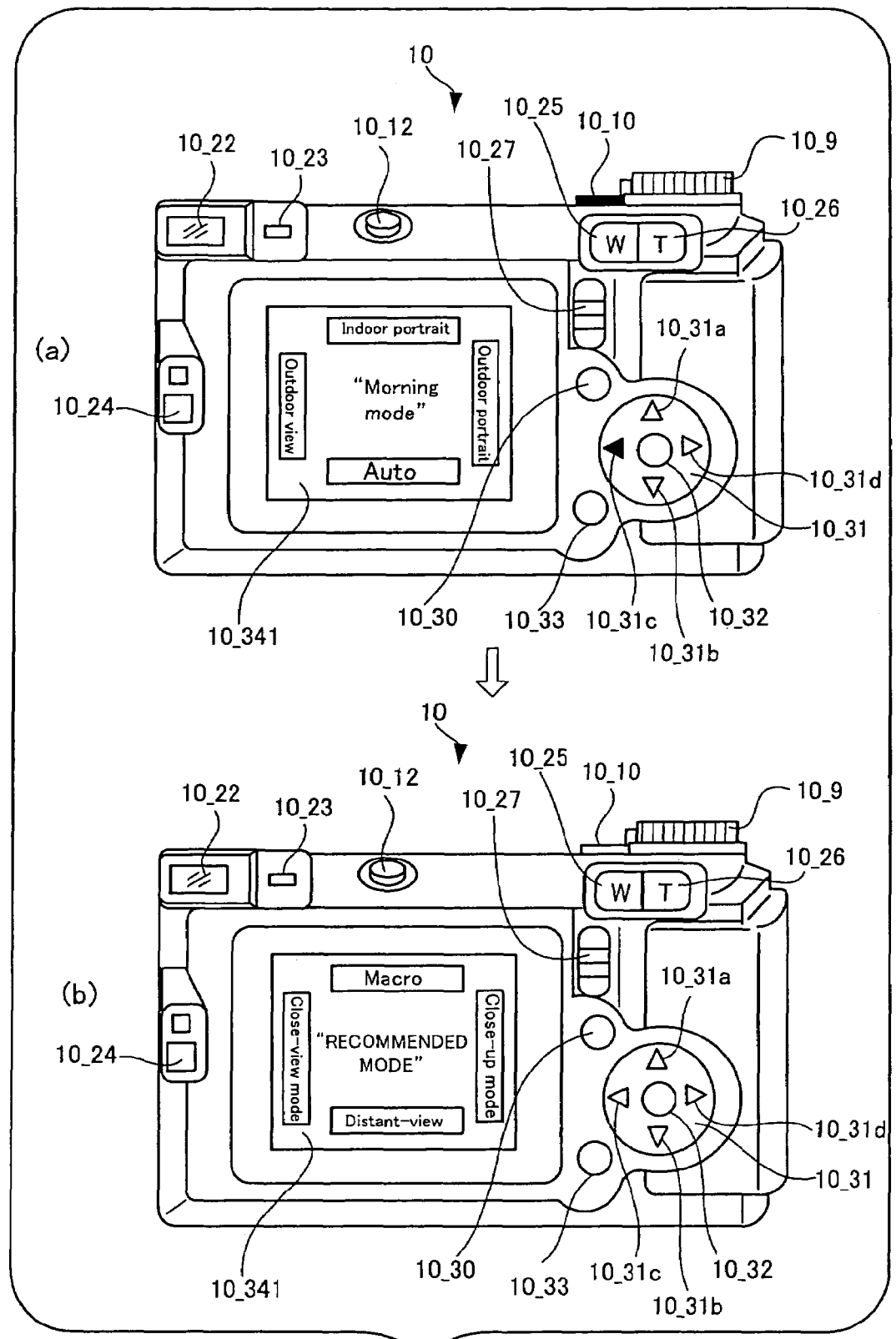
FIG. 5 is a diagram showing an example in which recommended shooting modes are displayed for a time frame of morning.
Figure 6:
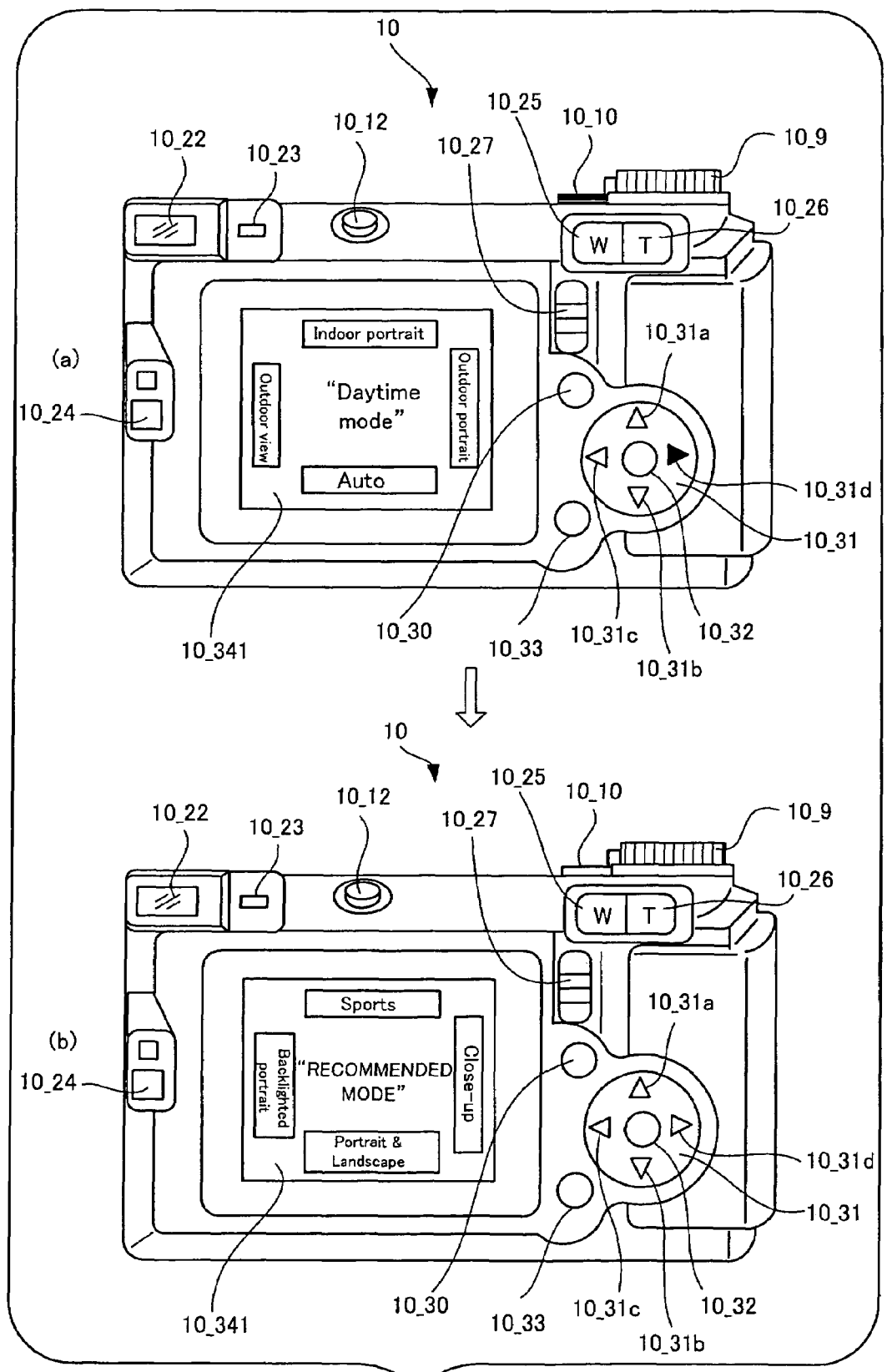
FIG. 6 is a diagram showing an example in which recommended shooting modes are displayed for a time frame of daytime.
Figure 7:
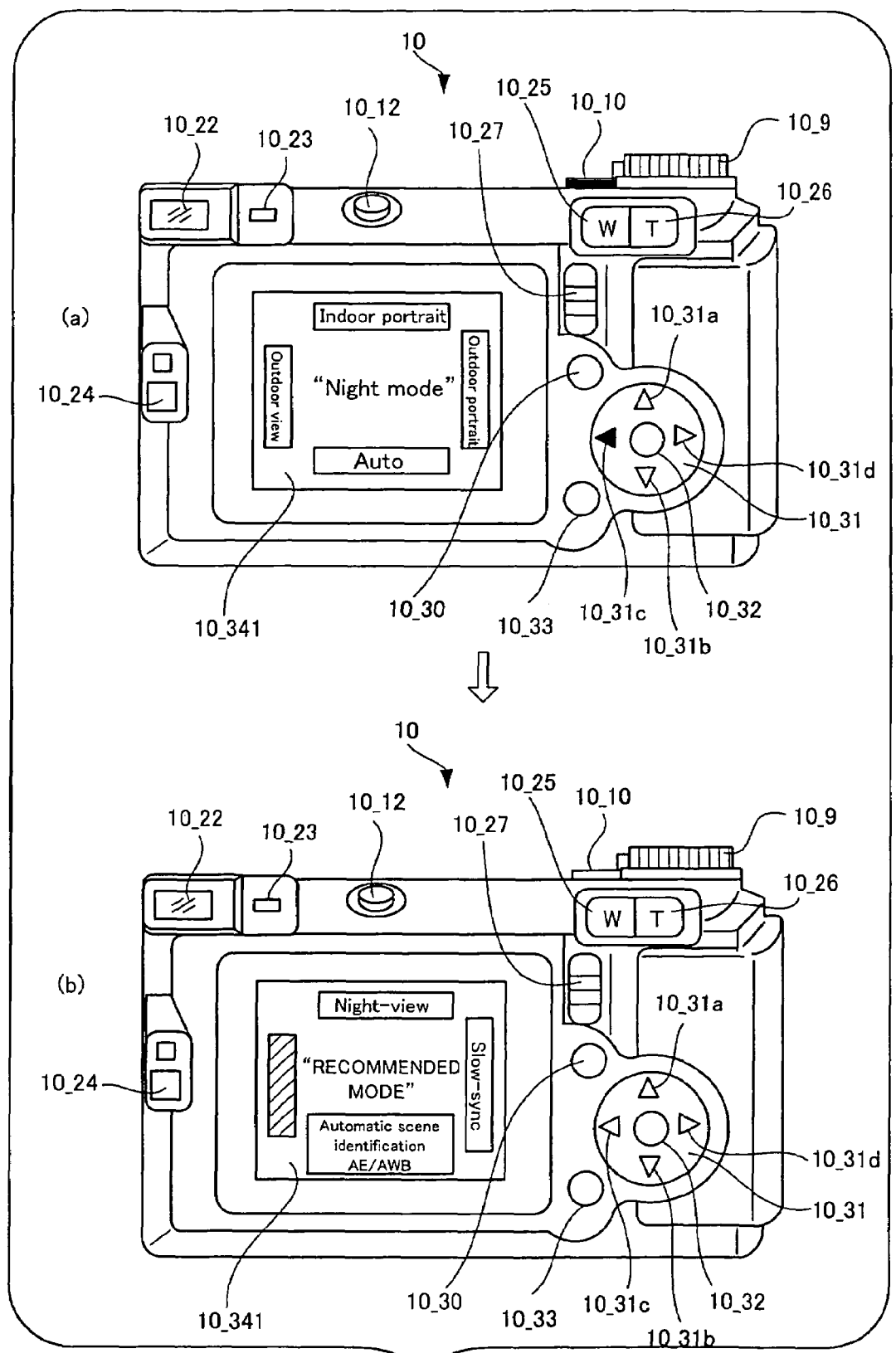
FIG. 7 is a diagram showing an example in which recommended shooting modes are displayed for a time frame of night.

FIGS. 5 through 7 are diagrams to explain how the display section 10_34 having the liquid crystal monitor 10_341 displays recommended shooting modes under the control of the CPU 10_47. In FIGS. 5 through 7, recommended shooting modes are displayed as "RECOMMENDED MODE".

The digital camera 10 of the embodiment is configured to operate in the following manner for the purpose of making it user-friendly. First, the CPU 10_47 causes the display section 10_34 to display options including the automatic mode (Auto) and three shooting scenes. When a user selects one of the scenes by operating the buttons 10_31a through 10_31d of the cross key 10_31 and the MENU/OK button 10_32, the CPU 10_47 causes the display section 10_34 to display shooting modes suitable for the selected scene in a time frame including the obtained time as "RECOMMENDED MODE".

More specifically, as shown in parts (a) of FIGS. 5 through 7, the CPU 10_47 causes the display section 10_34 having the liquid crystal monitor 10_341 to display options including the automatic mode (Auto) and three shooting scenes (outdoor view, outdoor portrait, indoor portrait), which implies a question asking a user "in what shooting scene are you going to shoot an image?" If any of the scenes is selected by the user through the cross key 10_31, the CPU 10_47 causes the display section 10_34 to display a screen with "RECOMMENDED MODE" such as those shown in parts (b) of FIGS. 5 through 7. If the automatic mode (Auto) is selected instead, the digital camera 10 is shifted to the standard shooting mode according to the present invention, in which exposure, white balance and the like are all automatically set by the digital camera 10.

As described above, processing for displaying screens shown in FIGS. 5 through 7 by the display section 10_34 are all controlled by the CPU 10_47 that corresponds to the "display control section" according to the invention. Upon the press of the power button 10_10 (or upon switching of the mode switch 10_27 from the playback mode to the shooting mode), the CPU 10_47 first causes the display section 10_34 to display any of the screens shown in parts (a) of FIGS. 5 through 7. Then the CPU 10_47 causes the display section 10_34 to display any of the screens shown in parts (b) of FIGS. 5 through 7 in response to any of the buttons 10_31a through 10_31d being operated by a user while looking at any of the screens shown in parts (a) of FIGS. 5 through 7.

While any of the screens shown in parts (b) of FIGS. 5 through 7 is displayed on the liquid crystal monitor 10_341, if any of the displayed shooting modes is selected by a user using the cross key 10_31 that corresponds to the "mode selecting section" according to the invention, the CPU 10_47 activates a program describing procedures for the selected mode.

The CPU 10_47 includes a program memory 10_471 storing programs. In accordance with the procedures described in a program stored in the program memory 10_471, the CPU 10_47 first causes the display section 10_34 to display two or more shooting modes on the liquid crystal monitor 10_341. If any of the displayed shooting modes is selected by a user through the cross key 10_31 and the MENU/OK button 10_32 in this state, the CPU 10_47 then causes the display section 10_34 to display two or more recommended shooting modes. Further, if any of the displayed recommended shooting modes is selected by the user through the cross key 10_31 and the MENU/OK button 10_32 in this state, the CPU 10_47 activates a program according the selected recommended shooting mode.

Some skilled users may want to select a mode using the mode dial 10_9 instead of selecting a recommended shooting mode so that they can setup everything by themselves. For the sake of such users, the digital camera 10 is configured as follows. If the mode switch 10_27 has been manually shifted to a certain position at the time when the power is turned on, the digital camera 10 displays a message: "do you want operations in shooting mode currently indicated on the mode dial?" If the MENU/OK button 10_32 is pressed in this state, the digital camera 10 performs processing according to the shooting mode represented by the position currently selected by the mode switch 10_27.

Now, with reference to FIGS. 5 through 7, there will be described what recommended shooting modes are displayed on the liquid crystal monitor 10_341 of the display section 10_34 according to time frames including morning, daytime, and night under the control of the CPU 10_47.

First, there will be described recommended shooting modes shown in part (b) of FIG. 5 by way of example, which are displayed according to a morning time frame indicated with a morning mode (see part (a) of FIG. 5).

For example, if the "outdoor view" is selected in the morning time frame, "close-view" mode and "distant-view" mode are displayed as recommended shooting modes, assuming that landscapes near a hotel may be shot on a trip because the itinerary may not be determined yet in the morning in many cases. In addition, "macro" mode and "close-up" mode are also displayed as alternative recommended shooting modes.

After any of the recommended shooting modes is selected, if the "close-view" mode, for example, is selected for taking an image, the CPU 10_47 causes a motor driver 10_49 to determine the focus position of the focus lens 10_1$a_2$ in a relatively close range. At the same time, the CPU 10_47 establishes an aperture value suitable for close views by controlling the motor driver 10_56 and the TG 10_40 in order to obtain a clear image with a relatively close background, for example, a statue standing near a hotel. Alternatively, if the "macro" mode is selected, the CPU 10_47 establishes an aperture value suitable for macro shooting by controlling the motor driver 10_56 and the TG 10_40. At the same time, the CPU 10_47 causes a motor driver 10_48 to place the zoom lens 10_1$a_1$ at a position (at which the zoom barrel 10_1 is advanced forward beyond the normal position) suitable for the macro shooting so that a user can take a clear image of, for example, a famous local flower and the like.

Alternatively, if the "outdoor portrait" is selected for example in a daytime time frame (see part (a) of FIG. 6), "backlighted portrait" mode and "portrait & landscape" mode are displayed as recommended shooing modes as shown in part (b) of FIG. 6 assuming that users often take portraits with a landscape as a background while visiting the sights on a trip. In addition, "close-up" mode and "sports" mode are displayed as alternatives.

For example, if the "backlighted portrait" mode is selected, the CPU 10_47 establishes parameters used for correcting colors in the image signal processing circuit 10_44 based on a result of white balance adjustment sent from the AE detection circuit 10_50. Further, if the "close-up" mode is selected for example, the CPU 10_47 causes the motor driver 10_56 to open the aperture of the diaphragm 10_1$a_3$ to some extent and causes the motor driver 10_49 to place the focus lens 10_1$a_2$ at the front pin position.

Alternatively, if the "outdoor view" is selected (see part (a) of FIG. 7), the CPU 10_47 causes the display section 10_34 to display "night-view" mode and "slow-sync" mode as recommended shooting modes assuming that not only night-views but also portraits with a night-view background may be shot (see part (b) of FIG. 7). In addition, "automatic scene identification AE/AWB" mode is also displayed as alternatives.

For example, if the "slow-sync" mode is selected to take an image including both a person and a night-view, the CPU 10_47 causes the flash emitting device 10_2 to emit a flash and at the same time causes the TG 10_40 to set a slow shutter speed. Alternatively, if the "automatic scene identification AE/AWB" mode is selected, the CPU 10_47 establishes parameters in the image signal processing circuit 10_44 according to a photometric value and an adjusted white balance that are obtained by the AE detection circuit 10_50 at the time of the half-press of the shutter button 10_8.

The above configuration enables a user to readily select a shooting mode without going through complicated operations. Therefore, even an amateur user can easily shoot an image in a desired mode when using the digital camera 10 because parameters according to the shooting mode are automatically set by the CPU 10_47 in the camera as described above.

So far, there has been described the embodiment in which the CPU 10_47 includes recommended shooting modes set beforehand. However, the camera of the invention may be configured such that a user can preset recommended shooting modes as selectable items. In such a configuration, the CPU 10_47 causes the display section 10_34 to display a setting change screen in response to an operation made on the MENU/OK button 10_32 so that a user can change selectable recommended shooting modes by operating the cross key 10_31 on the setting change screen. Upon selection of one mode on the "RECOMMENDED MODE" screen shown in parts (b) of FIGS. 5 through 7 by a user, a through image is displayed thereafter according to the selected mode.

Figure 8:
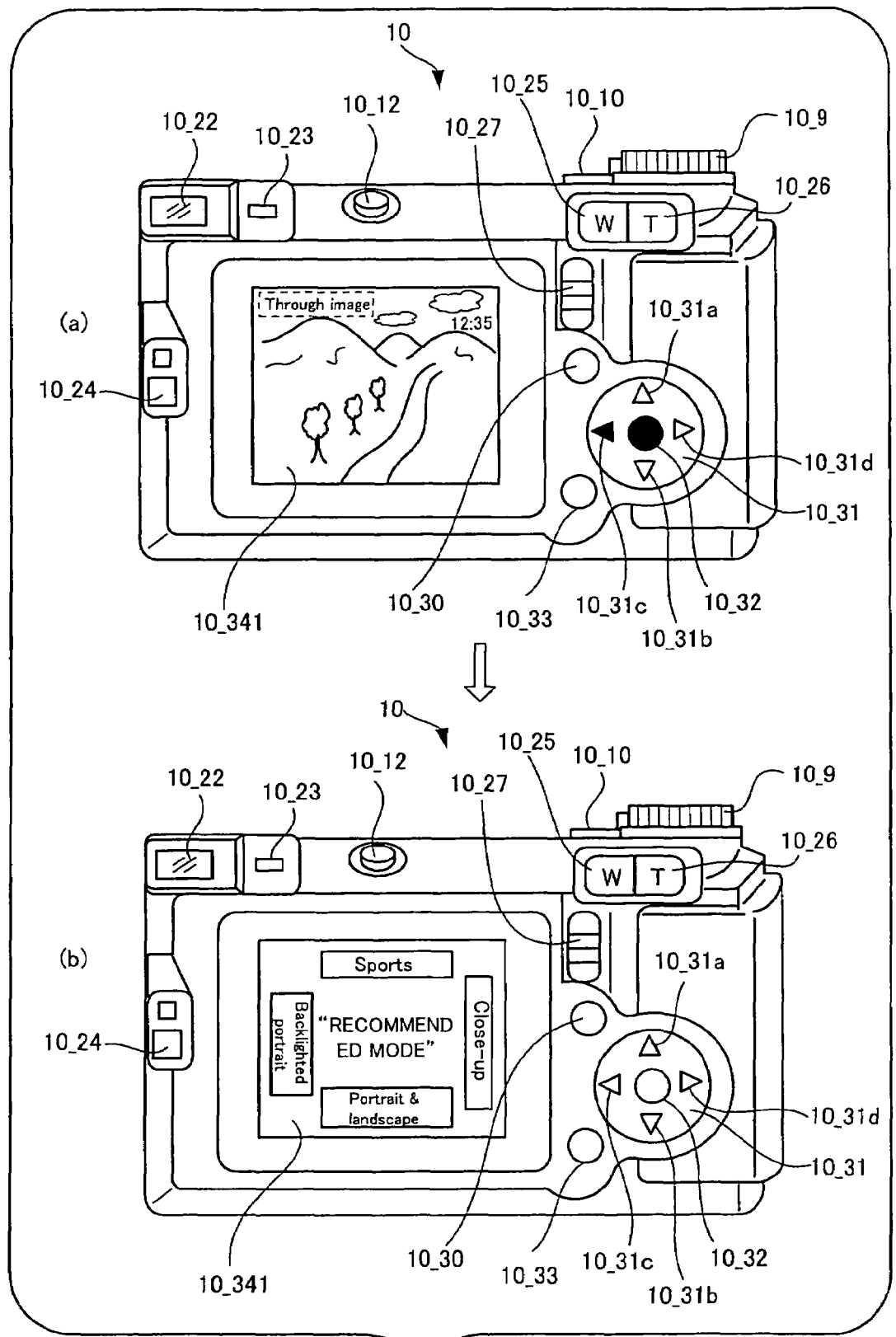
FIG. 8 is a diagram showing an example in which any of screens shown in parts (b) of FIGS. 5 through 7 is displayed in response to an operation made on buttons while a through image is displayed.

FIG. 8 is a diagram showing an example in which any of screens shown in parts (b) of FIGS. 5 through 7 is displayed in response to some buttons being operated while a through image is displayed. In this example, the left button 10_31c and the MENU/OK button 10_32 are simultaneously operated as shown in part (a) of FIG. 8.

As described above, the digital camera 10 is configured such that any of the screens shown in parts (a) of FIGS. 5 through 7 is displayed upon the press of the power button 10_10 or upon switching of the mode switch 10_27 from the playback mode to the shooting mode. In addition, the digital camera 10 is configured such that in response to an operation as shown in part (a) of FIG. 8 (when the left button 10_31c and the MENU/OK button 10_32 are simultaneously pressed in this example), a screen shown in part (b) of FIG. 8 (or any of screens shown in parts (b) of FIGS. 5 through 7) is displayed. This is convenient when a user wants to switch the current shooting mode to another shooting mode.

As described above, according to the invention, it is possible to readily change the shooting mode even if the camera provides various shooting modes.

What is claimed is:

1. An image-taking apparatus which has plural kinds of shooting modes for taking images in different shooting conditions and takes an image according to one selected from the shooting modes, the apparatus comprising:
    a built-in clock which keeps a current time;
    a display section which has a display screen and displays an image on the display screen;
    a display control section which causes the display section to display at least one of recommended shooting modes according to a time frame associated with the current time, the recommended shooting modes varying according to which of a plurality of time frames is associated with the current time; and
    a mode selecting section which enables a user to select any of the at least one of the recommended shooting modes displayed by the display section,
    wherein at least one of the recommended shooting modes displayed by the display section corresponds to a shooting mode most frequently used in the time frame associated with the current time.

2. An image-taking apparatus which has plural kinds of shooting modes for taking images in different shooting conditions and takes an image according to one selected from the shooting modes, the apparatus comprising:
    a built-in clock which keeps a current time;
    a display section which has a display screen and displays an image on the display screen;
    a display control section which causes the display section to display at least one of recommended shooting modes according to a time frame associated with the current time, the recommended shooting modes varying according to which of a plurality of time frames is associated with the current time; and
    a mode selecting section which enables a user to select any of the at least one of the recommended shooting modes displayed by the display section,
    wherein the display control section causes the display section to display a plurality of potential shooting scenes for selection by the user, wherein when the user selects one of the plurality of potential shooting scenes the display control section causes the display section to display at least one of recommended shooting modes suitable for the selected shooting scene and according to a time frame associated with the current time.

3. An image-taking apparatus according to claim 2, wherein the plurality of potential shooting scenes are selected from any of an outdoor view, an outdoor portrait, and an indoor portrait.

4. An image-taking apparatus which has plural kinds of shooting modes for taking images in different shooting conditions and takes an image according to one selected from the shooting modes, the apparatus comprising:
   a built-in clock which keeps a current time;
   a display section which has a display screen and displays an image on the display screen;
   a display control section which causes the display section to display at least one of recommended shooting modes according to a time frame associated with the current time, the recommended shooting modes varying according to which of a plurality of time frames is associated with the current time; and
   a mode selecting section which enables a user to select any of the at least one of the recommended shooting modes displayed by the display section,
   wherein the image-taking apparatus is enabled to allow a user to preset which of the shooting modes are selectable when the display control section causes the display section to display at least one of recommended shooting modes according to a time frame associated with the current time.

5. An image-taking method for taking images in different shooting conditions and for taking an image according to a shooting mode selected from plural kinds of shooting modes for taking images, the method comprising:
   acquiring a current time from a built-in clock which keeps the current time;
   determining at least one recommended shooting mode according to a time frame associated with the current time, the determined at least one recommended shooting mode varying according to which of a plurality of time frames is associated with the current time;
   displaying at least one of the recommended shooting modes on a display section; and
   enabling a user to select, using a mode selecting section, any of the at least one of the recommended shooting modes displayed by the display section,
   wherein at least one of the recommended shooting modes displayed by the display section corresponds to a shooting mode most frequently used in the time frame associated with the current time.

6. An image-taking method for taking images in different shooting conditions and for taking an image according to a shooting mode selected from plural kinds of shooting modes for taking images, the method comprising:
   acquiring a current time from a built-in clock which keeps the current time;
   determining at least one recommended shooting mode according to a time frame associated with the current time, the determined at least one recommended shooting mode varying according to which of a plurality of time frames is associated with the current time;
   displaying at least one of the recommended shooting modes on a display section;
   enabling a user to select, using a mode selecting section, any of the at least one of the recommended shooting modes displayed by the display section;
   displaying a plurality of potential shooting scenes for selection by the user; and
   when the user selects one of the plurality of potential shooting scenes, displaying at least one of recommended shooting modes suitable for the selected shooting scene and according to a time frame associated with the current time.

7. An image-taking method according to claim 6, wherein the plurality of potential shooting scenes are selected from any of an outdoor view, an outdoor portrait, and an indoor portrait.

8. An image-taking method for taking images in different shooting conditions and for taking an image according to a shooting mode selected from plural kinds of shooting modes for taking images, the method comprising:
   acquiring a current time from a built-in clock which keeps the current time;
   determining at least one recommended shooting mode according to a time frame associated with the current time, the determined at least one recommended shooting mode varying according to which of a plurality of time frames is associated with the current time;
   displaying at least one of the recommended shooting modes on a display section; and
   enabling a user to select, using a mode selecting section, any of the at least one of the recommended shooting modes displayed by the display section; and
   enabling a user to preset which of the shooting modes are selectable when displaying at least one of recommended shooting modes according to a time frame associated with the current time.

* * * * *